US007366356B2

(12) United States Patent
Rai et al.

(10) Patent No.: US 7,366,356 B2
(45) Date of Patent: Apr. 29, 2008

(54) GRAPHICS CONTROLLER PROVIDING A MOTION MONITORING MODE AND A CAPTURE MODE

(75) Inventors: Barinder Singh Rai, Surrey (CA); Phil Van Dyke, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 476 days.

(21) Appl. No.: 11/198,054

(22) Filed: Aug. 5, 2005

(65) Prior Publication Data

US 2007/0031045 A1 Feb. 8, 2007

(51) Int. Cl.
*G06K 9/36* (2006.01)

(52) U.S. Cl. ....................................... 382/236; 382/232

(58) Field of Classification Search ................ 382/232, 382/236, 221, 218, 124, 260; 348/607, 699, 348/E5.077, E5.079, 207.99; 375/240.16, 375/240.12, 240.02, E7.261
See application file for complete search history.

(56) References Cited

U.S. PATENT DOCUMENTS 5,581,297 A 12/1996 Koz et al. ................... 348/152
2002/0060737 A1 5/2002 Hsieh et al. ............. 348/208.1
2003/0151062 A1 8/2003 Cho ...................... 375/240.12
2004/0028137 A1 2/2004 Wyn-Harris et al. ... 375/240.17
2004/0080615 A1 4/2004 Klein et al. ................. 348/143
2004/0160529 A1 8/2004 Nagakura et al. ........... 348/452
2004/0233282 A1 11/2004 Stavely et al. .............. 348/373

*Primary Examiner*—Anh Hong Do
(74) *Attorney, Agent, or Firm*—Mark P. Watson

(57) ABSTRACT

A preferred embodiment is directed to an image processing device for receiving pixel data provided to the device as follows: it is grouped into frames, each pixel datum has an associated value, and first, second, and third pixel data correspond respectively to first, second, and third frames. The image processing device is adapted for processing the pixel data, and has a low-power motion monitoring mode and a capture mode. Further, the pixel data is preferably provided by a data source external to the device. The image processing device preferably includes a control unit for: (a) receiving the pixel data; (b) summing the values of the first pixel data to produce a first total value for the first frame; (c) summing the values of the second pixel data to produce a second total value for the second frame, and (d) causing the image processing device to process the third pixel data only if the difference between the first and second total values exceeds a threshold. If the difference between the first and second total values does not exceed the threshold, the third pixel data is discarded. Additionally, the image processing device preferably includes a memory, and the processing of the third pixel includes storing the third pixel data in the memory.

20 Claims, 3 Drawing Sheets

GRAPHICS CONTROLLER PROVIDING A MOTION MONITORING MODE AND A CAPTURE MODE

FIELD OF THE INVENTION

The present invention relates generally the processing of data received from an external data source. In particular, preferred embodiments relate generally to graphics display systems that include a graphics display device and a graphics controller, in which the graphics controller processes data received from a source external to the graphics controller, and provides a motion monitoring mode and a capture mode.

BACKGROUND

Graphics display systems in devices such as mobile telephones typically employ a graphics controller, which acts as an interface between one or more sources of image data and a graphics display device such as an liquid crystal display ("LCD") panel or panels. In a mobile telephone, the sources of image data are typically a camera and a host such as a CPU. The host and camera transmit image data to the graphics controller for ultimate display on the display device. The host also transmits control data to both the graphics controller and the camera to control the operation of these devices.

Graphics controllers typically provide various processing options for processing image data received from the host and camera. For example, the graphics controller may compress or decompress, e.g., JPEG encode or decode, incoming or outgoing image data, crop the image data, resize the image data, scale the image data, and color convert the image data according to one of a number of alternative color conversion schemes. All these image processing functions provided by the graphics controller are responsive to and may be directed by control data provided by the host.

The host also transmits control data for controlling the camera to the graphics controller, the graphics controller in turn programming the camera to send one or more frames of image data acquired by the camera to the graphics controller. Where, as is most common, the graphics controller is a separate integrated circuit, and the graphics controller, the host, and the camera are all remote from one another, instructions are provided to the camera, and image data from the camera are provided to the graphics controller for manipulation and ultimate display, through a camera interface in the graphics controller. Typically, the "capture" of image data obtained from a camera includes storing the data in a frame buffer in the graphics controller. The data are subsequently fetched from the frame buffer and provided to a display device interface of the graphics controller for transmission over a bus to the graphics display device.

Data storage and retrieval consume power as well as processing overhead, and it is always desirable to minimize such processing. The inventors have recognized that, in order to minimize processing overhead, it would be desirable if the graphics controller only processed the image data received from the host and camera when the subject being imaged moves. Accordingly, there is a need for a graphics controller providing an ordinary, capture mode for processing data received from an external camera and a low-power, monitoring mode of operation that can be used in circumstances in which it is not necessary to capture or otherwise fully process the data.

SUMMARY

In a preferred embodiment, an image processing device for receiving and processing pixel data has a motion monitoring mode and a capture mode. The pixel data is provided to the image processing device as follows: it is grouped into frames, each pixel datum has an associated value, and first, second, and third pixel data correspond respectively to first, second, and third frames. Preferably, the pixel data is provided by data source that is external to the image processing device. The image processing device includes a control unit for: (a) receiving the pixel data, (b) summing the values of the first pixel data to produce a first total value for the first frame; (c) summing the values of the second pixel data to produce a second total value for the second frame, and (d) causing the image processing device to process the third pixel data only if the difference between the first and second total values exceeds a threshold. If the difference between the first and second total values does not exceed the threshold, the third pixel data is discarded. Preferably, the image processing device includes a memory, wherein the processing of the third pixel includes storing the third pixel data in the memory.

Another preferred embodiment is directed to a method for receiving and processing pixel data. The pixel data is grouped into frames, each pixel datum has an associated value, and first, second, and third pixel data correspond respectively to first, second, and third frames. A preferred method includes: (a) receiving the first, second, and third pixel data from a data source; (b) summing values respectively associated with each pixel datum of the first pixel data to produce a first total value for the first frame; (c) summing values respectively associated with each pixel datum of the second pixel data to produce a second total value for the second frame; (d) determining a difference between the first and second total values; (e) processing the third pixel data only if the difference between the first and second total values exceeds a threshold; and (f) discarding the third pixel data, if the difference between the first and second total values does not exceed the threshold. Preferably, the step (e) of processing includes storing the third pixel data.

An additional preferred embodiment is directed to a graphics display system. The system preferably includes: (a) a host; (b) a display device; (c) a data source for providing pixel data, the pixel data being grouped into frames, each pixel datum having an associated value, and a first, second, and third pixel data correspond respectively to first, second, and third frames; and (d) a graphics controller for receiving the pixel data from the data source, and for processing the pixel data. The graphics controller preferably includes a control unit for: (i) summing the values of the first pixel data to produce a first total value for the first frame, (ii) summing the values of the second pixel data to produce a second total value for the second frame, and (iii) causing the graphics controller to process the third pixel data only if the difference between the first and second total values exceeds a threshold. If the difference between the first and second total values does not exceed the threshold, the third pixel data is discarded. Preferably, the data source is external to the graphics controller. In addition, the graphics display system preferably includes a memory, and the processing of the third pixel data by graphics controller includes storing the third pixel data in the memory.

In yet another preferred embodiment, the invention is directed to machine-readable media that contains a program of instructions executable by a machine for performing one or more of the preferred methods of the invention. Preferably, the method includes the steps of (a) receiving first, second, and third pixel data from a data source, which provides the pixel data in groups of frames, each pixel datum having an associated value, and first, second, and third pixel data correspond respectively to first, second, and third frames; (b) summing values respectively associated with each pixel datum of the first pixel data to produce a first total value for the first frame; (c) summing values respectively associated with each pixel datum of the second pixel data to produce a second total value for the second frame; (d) determining a difference between the first and second total values; (e) processing the third pixel data only if the difference between the first and second total values exceeds a threshold; and (f) discarding the third pixel data, if the difference between the first and second total values does not exceed the threshold. In addition, preferably, the step (e) of processing includes storing the third pixel data.

It is to be understood that this summary is provided for generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 1:
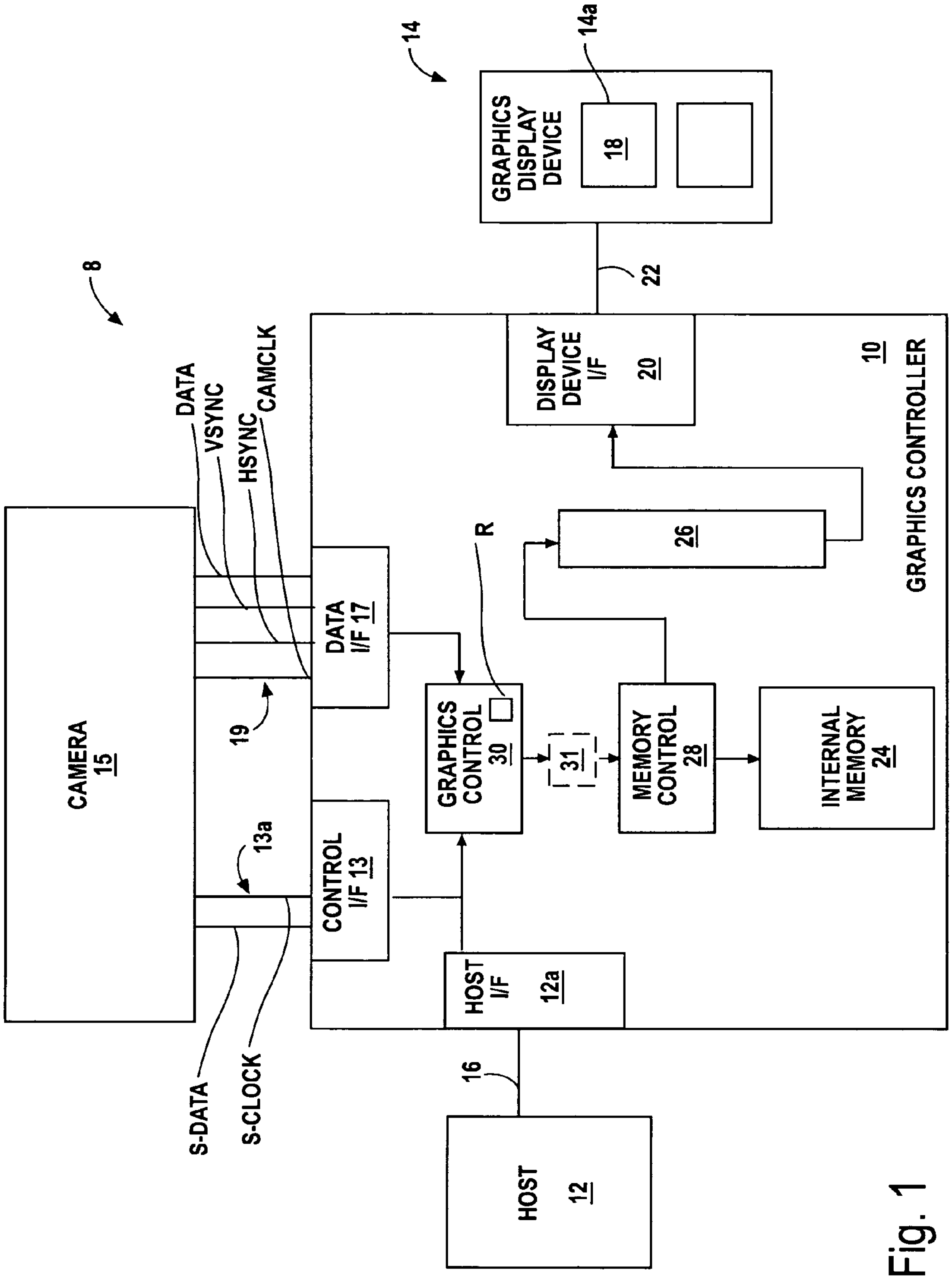
FIG. 1 is a block diagram of a graphics display system having a graphics controller providing a capture mode and a low-power monitoring mode for processing data received from an external data source according to a preferred embodiment of the present invention.

Preferred embodiments relate generally to an image processing device, such as a graphics controller or a display controller, for processing data received from a source external to the device, the device having a motion monitoring mode and a capture mode. In addition, preferred embodiments relate generally to methods for processing data received from a source, in which the method provides a low-power motion monitoring mode and a capture mode. The apparatus and methods are preferably for use in graphics display systems that include a graphics display device and a graphics controller. Accordingly, preferred embodiments are also directed to graphics display systems. Further, additional preferred embodiments are directed to machine-readable media, which contain a program of instructions executable by a machine for performing one or more of the preferred methods of the invention. Reference will now be made in detail to specific preferred embodiments, examples of which are illustrated in the accompanying drawings. Wherever possible, the same reference numbers are used in the drawings and the description to refer to the same or like parts.

One preferred graphics display system is a mobile telephone, wherein a graphics controller (or other unit) is a separate integrated circuit from at least some of the other elements of the system, but it should be understood that graphics controllers, display controllers, and other units having similar functionality which incorporate aspects of the invention may be used in other systems, and may be integrated into such systems as desired without departing from the principles of the invention. The inventors have recognized that it is often desirable to update a graphics display with new data obtained from a source of image data, such as a camera, only when the subject being imaged moves. For example, the camera may be used for monitoring a door, where it is desired to capture or store the image data received from the camera only if the door opens. In addition, the inventors have recognized that it is also desirable to perform image processing operations on new data received from a data source only when the subject being imaged moves. Such a data capture scheme permits significant savings in power. However, these data capture schemes are typically too expensive and complicated to be practical for use in mobile, battery-powered appliances, such as mobile telephones, personal digital assistants, and portable music players.

Motion detection generally involves comparing a previous sensed value and a current sensed value to determine a change, where the sensed value is indicative of movement. For detecting motion in the space imaged by a camera, a specialized motion detector has been used, such as an infrared motion detector for sensing changes in heat caused by the sudden introduction of a warm object into the space. Some problems with this methodology are that infrared sensors cannot be programmed to make fine distinctions between possible motions, and that extra hardware in addition to the camera is required. Further, the addition of an infrared motion detector to a mobile device would undesirably increase the parts count and the cost of the device.

Comparing frames of pixel data output from a camera may be used for motion detection. Particularly, a first frame of pixel data is stored, and the pixels in a subsequent frame are compared on a pixel-by-pixel basis with the pixels of the stored frame to determine whether a change has occurred. An advantage of using a camera for motion detection is that many mobile devices are now provided with cameras. However, a limitation of this methodology for detecting motion is that each frame must be stored or captured. Accordingly, this methodology is expensive in terms of power consumption, memory bandwidth, and memory requirements. For instance, a 640×480 frame comprises over 300K pixels. At 24 bpp, this image requires over 900 kB of storage space. Further, video frames may be written to memory as often as 20 times per second. While it would be desirable to use a camera for motion detection in battery-powered systems, in order to be of practical use, the high-power, expensive requirement that each frame be stored in memory needs to be avoided.

Referring to FIG. 1, a system 8 including a graphics controller 10 according to one preferred embodiment is shown. The system 8 may be any digital system or appliance providing graphics output; where it is a portable appliance such as a mobile telephone, personal digital assistants, or portable music player, it is powered by a battery (not shown). The system 8 preferably includes a host 12 and a graphics display device 14, and one or more camera modules ("camera") 15. The graphics controller 10 interfaces the host and camera with the display device. The graphics controller is preferably separate (or remote) from the host, camera, and display device. The host 12 is typically a microprocessor, but may be a digital signal processor, computer, or any other type of controlling device adapted for controlling digital circuits. The host communicates with the graphics controller 10 over a bus 16 to a host interface 12*a* in the graphics controller 10.

The display device 14 has one or more display panels 14*a* with corresponding display areas 18. The one or more display panels 14*a* are adapted for displaying on their display areas pixels of image data (hereinafter "pixel data"). LCDs are typically used as display devices in mobile telephones, but any device(s) capable of rendering pixel data in visually perceivable form may be employed, including CRT and OLED display devices, as well as hard copy rendering devices, such as printers. The shown graphics controller 10 includes a display device interface 20 for interfacing between the graphics controller and the display device over a display device bus 22.

The pixel data defining a single red-green-blue ("RGB") pixel are typically 24-bit sets of three 8-bit color components but may have any other range and may be limited to one or more of the components. The pixel data may be output from the camera 15 in the RGB color format or in a YUV color format, where "Y" relates to the luminance value of the data, and "U" and "V" relate to chrominance values of the pixel data. In a preferred embodiment, the camera outputs YUV, 422 image data and the graphics controller 10 includes a color conversion unit 31 for converting the image data into RGB pixels as it is received. As one skilled in the art will appreciate, "422" refers to four Y samples, two U samples, and two V samples in a group of 4 sequential samples. The color-converted pixel data may be stored in a frame buffer in memory for display, provided to a compression unit (not shown), or to another image processing module.

A "frame" of pixel data corresponds to an image. For example, a single image frame may have 64 lines of pixels, where each line contains 128 pixels. The pixel data of a particular frame are typically streamed from the camera 15 in a raster scan order, that is, as the image is scanned from side to side in lines from top to bottom, pixels are output. For purposes of the present invention, however, it is not essential that the pixel data be in raster order. What is important is that all of the pixels for a particular frame be streamed as a single group. In other words, if three frames (1, 2, and 3) are output from the camera, all of the pixels of frame 1 are streamed as a group, all of the pixels of frame 2 are streamed as a group, and all of the pixels of frame 3 are streamed as a group. Further, frames are output from the camera 15 and received by the graphics controller 10 in a sequential order. Preferably, the sequence corresponds to the temporal sequence in which the frames were imaged, e.g., frame 1, frame 2, frame 3.

The camera 15 acquires the pixel data and provides the pixel data to the graphics controller 10, in addition to any pixel data provided by the host. The camera is programmatically controlled through a "control" interface 13 which provides for transmitting control data ("S_Data") to and from the camera and a clock signal ("S_Clock") for clocking the control data. A serial bus 13*a* serving the interface 13 is preferably that known in the art as an inter-integrated circuit (or $I^2C$) bus.

The graphics controller also has a parallel "data" interface 17 for receiving pixel data output over DATA lines of a bus 19 from the camera 15 along with vertical and horizontal synchronizing signals ("VSYNC" and "HSYNC"), and a camera clocking signal CAMCLK provided to the camera by the graphics controller for clocking the pixel data out of the camera.

Frames of pixel data are of predetermined size, or are a predetermined number of pixels. For example, 640×480 pixels. The frames are separated by VSYNC signals output from the camera 15. Particularly, following the assertion of VSYNC, subsequent rising edges of a pixel clocking signal CAMCLK are synchronized with, and can be used to identify, individual pixel data within a particular frame. The receipt of another VSYNC signal indicates the termination of the particular frame.

According to one preferred embodiment of the invention, the graphics controller 10 provides for switching between two modes of data acquisition through use of a graphics control circuit 30. The modes are: a "capture" mode, and a "motion monitoring" mode.

In the capture mode, the control circuit 30 receives image data from either or both the camera 15 and the host 12 and captures it for one or more image processing operations. More particularly, the data received from the camera 15 is preferably passed to the color converter 31 and then to a memory controller 28 for storage in an internal memory 24. Data received from the host 12 (and some cameras) typically does not need color conversion and so is preferably passed directly to the memory controller for storage in memory 24. In FIG. 1, the optional nature of color conversion is represented by dashed lines for the color converter 31. Image processing operations such as cropping or scaling may also be performed in capture mode. While not shown in FIG. 1, cropping and scaling operations may be performed by modules within the graphics controller 10 prior to storage in the memory 24. Further, an image compression operation, such as JPEG encoding, may also be performed in the capture mode by a module (not shown) within the graphics controller 10. Compressed image data may then be stored in the memory 24 or transmitted from the graphics controller to another device, such as to the host 12. After the pixel data is stored in memory for subsequent display, the memory controller 28 fetches the data from the memory 24 as needed and transmits the data to the display device interface 20 through a first-in-first-out ("FIFO") buffer 26. It will be appreciated that image processing operations other than those described may be performed in capture mode. Further, one, several, or all of the described (and not described) image processing operations may be performed in capture mode.

In the motion-monitoring mode, the graphics controller 10 preferably does not perform image processing operations, including those described above as well as other operations. In a preferred embodiment, the pixel data streamed from the camera 15 and received in the graphics controller 10 are not passed by the graphics control circuit 30 to the memory controller 28 for storage in the memory 24. Preferably, the pixel data streamed from the camera 15 are not cropped, scaled, or compression encoded, or otherwise image processed. Instead, the pixel data are analyzed to detect motion. After being analyzed, the pixel data are preferably discarded. As a result of being analyzed, a total value "TLN" for the pixel data of the particular frame is determined. In the motion-monitoring mode, preferably, only the total value for the frame is stored or processed further.

In the motion-monitoring mode, pixel data are preferably streamed from the camera 15 to the control circuit 30 over the DATA lines of the bus 19, through the data interface 17 of the graphics controller 10 (see FIG. 1). As mentioned above, the pixel data of particular frames are grouped together so that all of the pixel data corresponding to a particular frame are streamed before any pixel data corresponding to a subsequent frame are streamed. Thus, frames are received by the graphics controller 10 in a sequential order.

Figure 3:
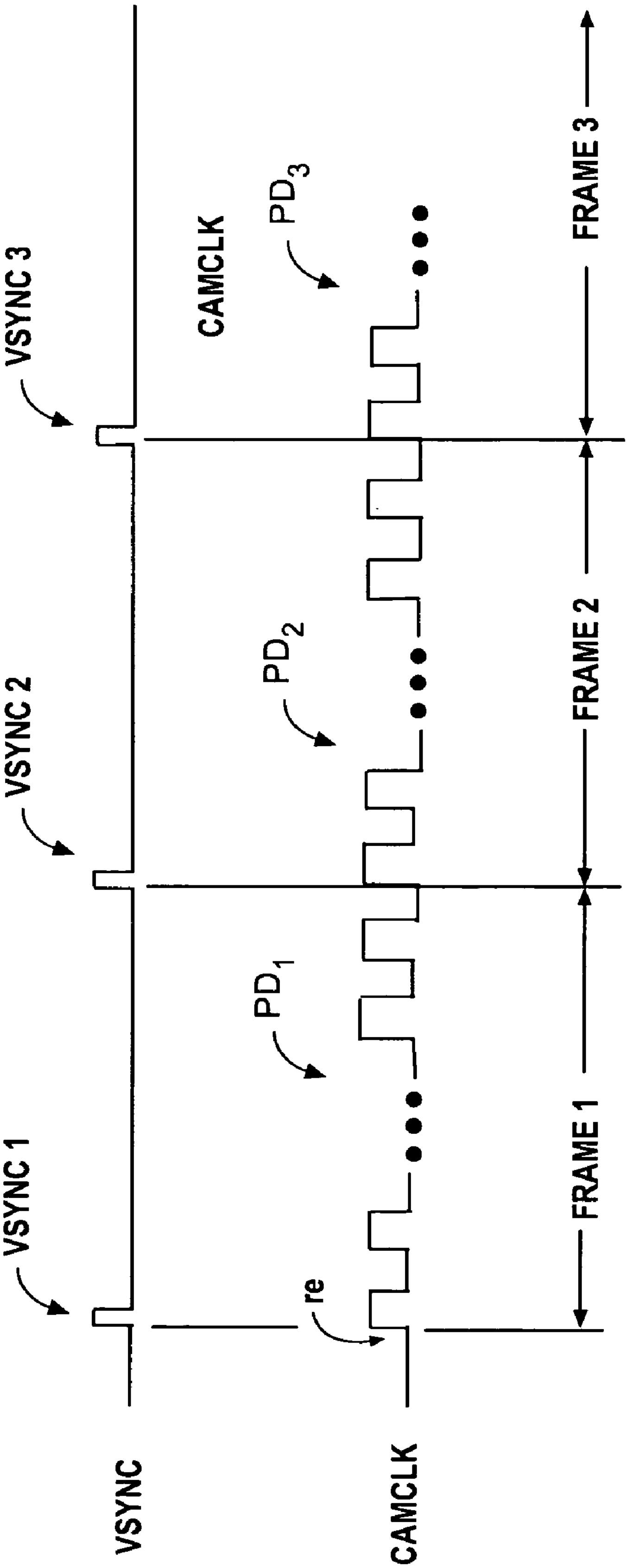
FIG. 3 is a timing diagram for a data source illustrating a preferred methodology for identifying pixel data as belonging to particular frames according to the present invention.

The control circuit 30 preferably identifies the pixel data as belonging to particular frames as the pixel data are received, i.e., "on the fly." More particularly, with additional reference to FIG. 3, the control circuit 30 responds to the receipt of a first VSYNC signal "VSYNC 1 " corresponding to the first frame (FRAME 1) and immediately (or at some other predetermined time that is synchronized therewith) starts counting on, e.g., the rising edges of the signal CAMCLK. Each rising edge "re" represents a time at which pixel data $PD_1$ received from the camera 15 by the graphics controller 10 for the current frame are valid on the DATA lines of bus 19 and belong to the first frame. Pixel data may be received for the current frame until a second VSYNC signal "VSYNC 2" is asserted. In FIG. 3, the assertion of VSYNC 2 corresponds to the initiation of transmission of pixel data $PD_2$ of the second frame (FRAME 2). Subsequently, each rising edge "re" represents a time at which pixel data $PD_2$ received from the camera 15 for the second frame are valid on DATA lines. On assertion of a third VSYNC signal "VSYNC 3," the camera has streamed all of the pixel data PD2. VSYNC 3 corresponds to the initiation of transmission of pixel data $PD_3$ of the third frame (FRAME 3). Once again the rising edges of the CAMCLK signal indicate valid data on the DATA lines belonging to the third frame, and so on.

In the motion-monitoring mode, the pixel data provided to the graphics controller are analyzed to detect motion. The pixel data are analyzed in such a way that total values for the pixel data for each of two successive frames are determined. For each of the pixel datum in a frame, a "value" is chosen for analysis purposes. The value is preferably a binary or other numeric representation of the pixel. In a preferred embodiment, the image is provided as a gray scale image where each pixel datum is 1 byte and can take a value from 0 to 255, and the full byte is chosen as the value for analysis purposes. In another preferred embodiment, the image is provided as a color image where each pixel datum is preferably 3 bytes and each byte can take a value from 0 to 255. Each of the three bytes is used separately as a value for analyses purposes. Alternatively, the image may be provided as a color image where each pixel datum is 3 bytes and each datum can take a value from 0 to 8,388,607, and the full 24-bit word is chosen as a value for analysis purposes. In yet another alternative, the image is provided as an RGB or a YUV color image where each pixel datum is 3 bytes and each byte can take a value from 0 to 255. In this alternative, only one of the bytes, such as the Y byte, is selected as a value for analysis purposes. In other alternatives, the least significant or most significant bits of a pixel datum may be selected as a value for analysis purposes. For instance, the two or four the least significant bits may be selected as a value for analysis purposes. Whatever value is chosen for analysis purposes, the value may be and preferably is discerned "on the fly" as the pixel data are streamed from the camera 15. Referring again to FIG. 1, the control circuit 30 preferably performs the function of discerning the value for each pixel datum as the pixel data are received.

The control circuit 30, having identified a pixel datum as belonging to a particular frame and discerning the value associated with datum, preferably adds the value to running total for the frame and then discards the datum. Accordingly, when all of the pixel datum for a frame has been received, the control circuit 30 has summed the values of all the pixel data for the frame. In a preferred embodiment, the control circuit 30 is adapted to determine the difference between this sum and another sum, which is preferably the sum for another frame. Further, the control circuit 30 is adapted to cause the graphics controller to switch into the capture mode. The control circuit 30 causes a switch to capture mode if the difference between the two values exceeds a threshold. On the other hand, if the difference between the two values does not exceed the threshold, the control circuit 30 does not a switch the graphics controller to the capture mode.

Figure 2:
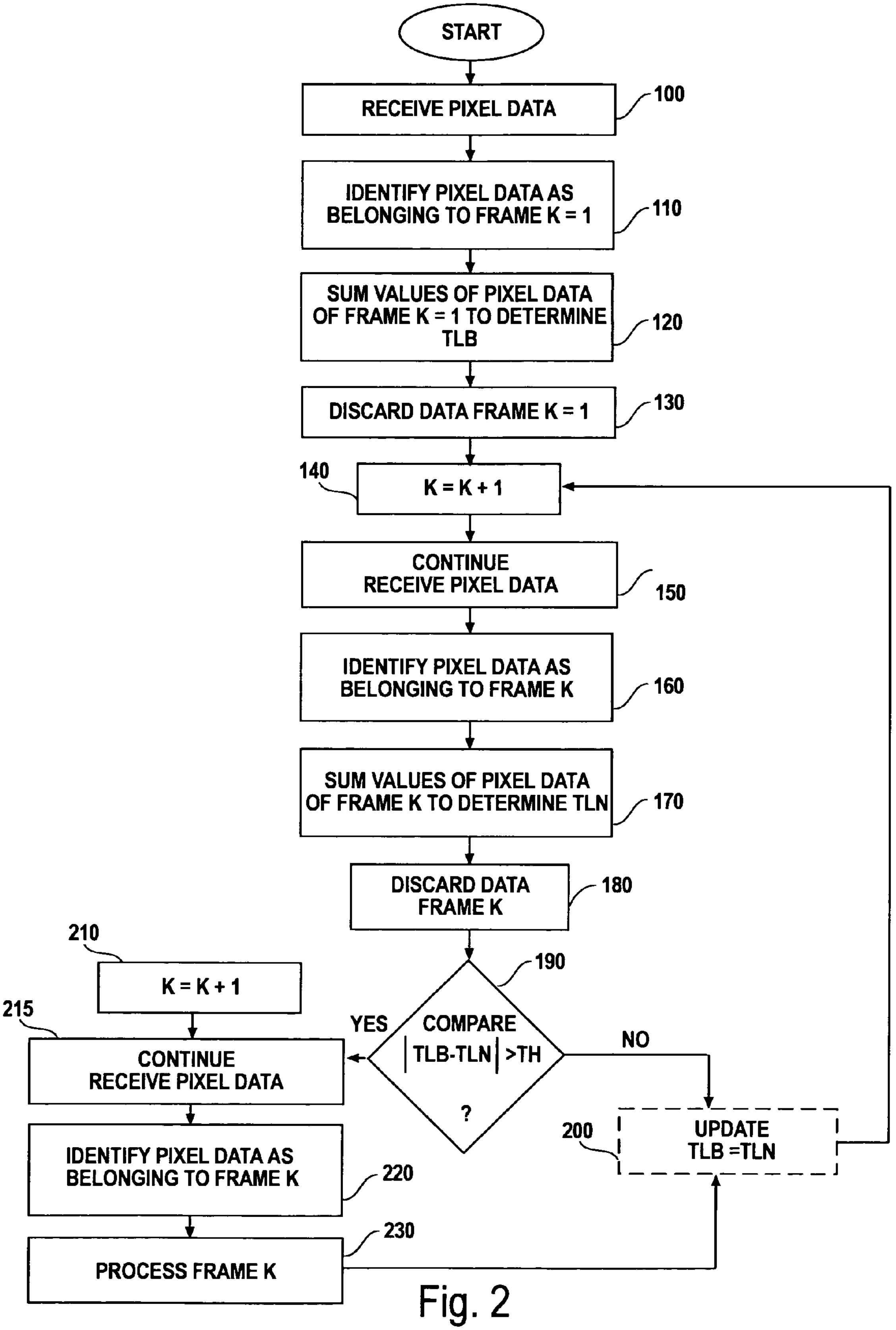
FIG. 2 is a flow diagram of a preferred method employed in the graphics display system of FIG. 1 according to the present invention.

FIG. 2 provides a flow chart of one preferred method. The control circuit 30 at step 100 receives initial pixel data. At step 100, it is assumed that a motion-monitoring mode is in effect. The pixel data are identified at step 110 as belonging to a first frame, i.e., a frame K, where K=1. The values of the pixels of the frame K=1 are discerned and summed, in step 120, for determining a total value=TLV for the frame K=1, which is then re-designated as a total value TLB. The total value TLB is a baseline quantity representative of the scene being imaged by the camera 15, as represented by the frame K=1. As shown in FIG. 1, a register R is preferably provided for storing the baseline quantity value for later use.

Once the discerned value for a pixel datum of the frame K=1 has been summed in step 120, it is no longer needed in the motion monitoring mode and may advantageously be discarded at step 130 instead of incurring the cost of storing or further processing the data. It will be appreciated that the total value=TLV for the frame K=1 is accumulated as a "running total," wherein the total value is the final total after the last value has been summed. As a simple example for purposes of illustration, assume a frame comprising 16 8-bit gray scale pixels having decimal values 4, 3, 2, 1, 4, 3, 2, 1, 4, 3, 2, and 1, and these decimal value are used for analysis purposes. In this example, the running total takes the successive values 4, 7, 9, 10, 14, 17, 19, 20, 24, 27, 29, and 30, and the total value=TLV for the frame is 30. The use of a running total permits the values to be discarded after they have been summed.

At step 140, the value K is incremented so that pixel data that are received (step 150), and identified as belonging to a second frame (step 160), i.e., a frame K=2. The pixel data are evaluated for discerning their values and the values are summed in step 170 25 for determining a total value=TLN for the frame K=2. The data of the frame K=2 may also advantageously be discarded (step 180). Preferably, the total value TLN is the representation of the same scene as represented by the frame K=2. That is, the camera 15 preferably images the same scene in order that motion may be detected within the scene. Alternatively, movement of the camera 15 may be detected by imaging different scenes.

At step 190, the total value TLN for the frame K=2 is compared with the baseline quantity TLB and the results of the comparison are measured against a threshold "TH." The threshold is either (equaled or) exceeded or not. To continue the simple, illustrative example of the frame comprising 16 8-bit gray scale pixels having a TLV=30, assume a second frame having a TLV of 25. In this example, the TLV of the first frame is designated as the baseline quantity and compared with the TLV of the second frame, i.e., the baseline quantity 30 is compared with the quantity 25. The difference between the frames is 5.

If the absolute value of the difference between the quantities TLB and TLN is less than (or equal to) a threshold "TH" (indicated as "NO"), then the method assumes that no motion has been detected, because an insufficient change in the total values of the two frames has occurred. Preferably, the quantity TLB stored in the register R is now replaced with the quantity TLN for the frame K=2 (step 200), so that the baseline total value that previously represented the total value for the frame K=1 now represents the total value for the frame K=2. However, it is not essential that the quantity TLB be replaced with the TLN for the frame K=2. In either case, the motion monitoring mode is continued by returning to step 140 where K is incremented to set up evaluation of the frame K=3.

On the other hand, if the comparison at step 180 yields a result that (equals or) exceeds the threshold "TH" (indicated as "YES"), the control circuit 30 causes the graphics controller to switch to the capture mode. At step 210, the value of K is incremented so that K=3, and pixel data subsequently received are identified as belonging to the frame K=3 (step 220). At step 215, pixel data of the frame K=3 are received. At step 230, the pixel data identified as belonging to frame 3 are subject to further capture mode processing such as the processing described above. As mentioned, this further processing may include storage of the pixel data of the frame K=3 in the internal memory 24, cropping, scaling, image compression, and other image processing operations. The previous quantity TLB stored in the register R may be replaced with the quantity TLN for the frame K=2 (step 200), so that the baseline total value that previously represented the total value for the frame K=1 now represents the total value for the frame K=2. As with frames where the result of the comparison at step 180 does not exceed, the step 200 is not required. The motion monitoring mode may then be continued by returning to step 140 where K is incremented to set up evaluation of the frame K=4.

Alternatively, the circuit 30 may be programmed (through another register), or hard-wired, to continue sending data to the memory controller 28 in the capture mode of steps 210-230 until a trigger signal is initiated by a user to revert to the motion monitoring mode (returning to step 140 through step 200). As just one alternative, the circuit 30 may revert to power conservation mode immediately after capturing one, or two a predetermined number, or a programmable number of subsequent frames.

The threshold "TH" is used to assess whether the difference in the total values of two frames is sufficient for inferring that motion within the scene being imaged has occurred. Any desired value may be chosen for the threshold. In the simple, illustrative example of a frame comprising 16 8-bit gray scale pixels where the baseline frame value is 30 and the frame 2 value is 25, the difference between the frames is 5. This difference represents 17 percent of the baseline frame value, and it may reasonably be inferred in this example that motion within the scene being imaged has occurred. Accordingly, in this example it may be appropriate to select a threshold value TH that is 5 or lower, such as 3 or 4. Typical embodiments will have many more pixels and may have values associated with pixels that are 42 bits or more. Accordingly, a threshold value TH of 3 or 4 is not typical, and TH will generally be much larger. Further, it is assumed that the two frames are imaged by the camera close in time. For example, in an outdoor scene, the lighting illuminating a scene may change over longer periods causing differences between frame values even though no motion has occurred. Preferably, then the threshold "TH" is variable and selectable. This permits the user to experimentally determine an appropriate threshold which takes into account various environmental factors. In one preferred embodiment, an adjustor unit is provided for sensing when a user control for selecting a value of TH has been activated. The adjustor unit translates the user input into a value for storage in the register where TH is stored.

As can be appreciated from the above description, the invention provides the outstanding advantage of providing for reduced power consumption in situations in which the camera in a graphics display system is used generally for monitoring a scene, and is only used for capturing an image of the scene for image processing operations when motion has occurred in the scene. This advantage is particularly important in low-cost, battery powered consumer appliances such as cellular telephones, portable digital assistants, portable digital music players, and the like.

The same principles can be applied according to the invention in circumstances in which a low quality or low resolution image is captured in the power conservation mode, or in circumstances in which a lesser degree of processing is desired for the data, while the capture mode would be reserved only for image data for which additional processing, including data capture, are desired.

While described in the context of detecting motion in pixel data produced by a camera, the pixel data may be provided by the host 12 or any other source of image data.

It should be understood that, while preferably implemented in hardware, the features and functionality described above could be implemented in a combination of hardware and software, or be implemented in software, provided the graphics controller is suitably adapted. For example, in one embodiment, a machine-readable media that contains a program of instructions executable by a machine for performing one or more of the preferred methods of the invention may be provided.

It is further to be understood that, while a specific a graphics controller and system providing a capture mode and a low-power motion monitoring mode for processing data received from an external camera has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An image processing device for receiving and processing pixel data, the pixel data being grouped into frames, each pixel datum having an associated value, comprising:

a control unit for:

for receiving pixel data that are streamed from a data source external to the device, wherein a first, second, and third pixel data correspond respectively to first, second, and third frames, summing the values of the first pixel data to produce a first total value for the first frame, summing the values of the second pixel data to produce a second total value for the second frame, causing the image processing device to process the third pixel data only if the difference between the first and second total values exceeds a threshold, and causing the image processing device to discard the third pixel data if the difference between the first and second total values does not exceed the threshold.

2. The image processing device of claim 1, further comprising a memory, wherein the processing of the third pixel data includes storing the third pixel data in the memory.

3. The image processing device of claim 1, further comprising a data compression module for compression encoding the third pixel data, wherein the processing of the third pixel data includes compression encoding the third pixel data.

4. The image processing device of claim 1, wherein the control unit is further adapted for summing the values of the third pixel data to produce a third total value for the third frame, and for causing the image processing device to process a fourth pixel data corresponding to a fourth frame only if the difference between the first and third total values exceeds the threshold.

5. The image processing device of claim 1, further comprising an adjustor for adjusting the threshold.

6. The image processing device of claim 1, further comprising a graphics controller.

7. A method for receiving and processing pixel data, the pixel data being grouped into frames, comprising:

receiving first, second, and third pixel data from a data source, the first, second, and third pixel data corresponding respectively to first, second, and third frames;

summing values respectively associated with each pixel datum of the first pixel data to produce a first total value for the first frame;

summing values respectively associated with each pixel datum of the second pixel data to produce a second total value for the second frame;

determining a difference between the first and second total values;

processing the third pixel data only if the difference between the first and second total values exceeds the threshold; and discarding the third pixel data if the difference between the first and second total values does not exceed the threshold.

8. The method of claim 7, wherein the step of processing includes storing the third pixel data.

9. The method of claim 7, wherein the step of processing includes compression encoding the third pixel data.

10. The method of claim 7, further comprising a step of selecting a threshold.

11. The method of claim 7, further comprising summing values respectively associated with each pixel datum of the third pixel data to produce a third total value for the third frame, determining a difference between the first and third total values, and processing fourth pixel data corresponding to a fourth frame only if the difference between the first and third total values exceeds the threshold.

12. The method of claim 7, wherein the method is performed remotely from the data source.

13. The method of claim 7, wherein each pixel datum includes a Y, U, and V component, and the associated value of each pixel datum is the Y component.

14. A graphics display system, comprising:

a host;

a display device;

a data source for providing pixel data, the pixel data being grouped into frames, each pixel datum having an associated value, wherein a first, second, and third pixel data correspond respectively to first, second, and third frames;

a graphics controller for receiving the pixel data from the data source, and for processing the pixel data, the graphics controller including:

a control unit for:

summing the values of the first pixel data to produce a first total value for the first frame, summing the values of the second pixel data to produce a second total value for the second frame, causing the graphics controller to process the third pixel data if the difference between the first and second total values exceeds a threshold, and causing the graphics controller to discard the third pixel data if the difference between the first and second total values does not exceed the threshold.

15. The graphics display system of claim 14, wherein the data source is external to the graphics controller.

16. The graphics display system of claim 15, further comprising a memory, wherein processing of the third pixel data by the graphics controller includes storing the third pixel data in the memory.

17. The graphics display system of claim 16, further comprising a data compression module, wherein processing of the third pixel data by the graphics controller includes compression encoding the third pixel data.

18. The graphics display system of claim 14, wherein the graphics controller is further adapted for summing the values of the third pixel data to produce a third total value for the third frame, and for causing the graphics controller to process a fourth pixel data corresponding to a fourth frame if the difference between the first and third total values exceeds the threshold.

19. The graphics display system of claim 14, wherein each pixel datum includes at least two components, and the associated value of each pixel datum is one of the at least two components.

20. The graphics display system of claim 14, wherein the associated value of each pixel datum is the three least significant bits of the pixel datum.

* * * * *